Oct. 28, 1952    W. M. PERDUE    2,615,589
FLOWER BOX
Filed July 19, 1950
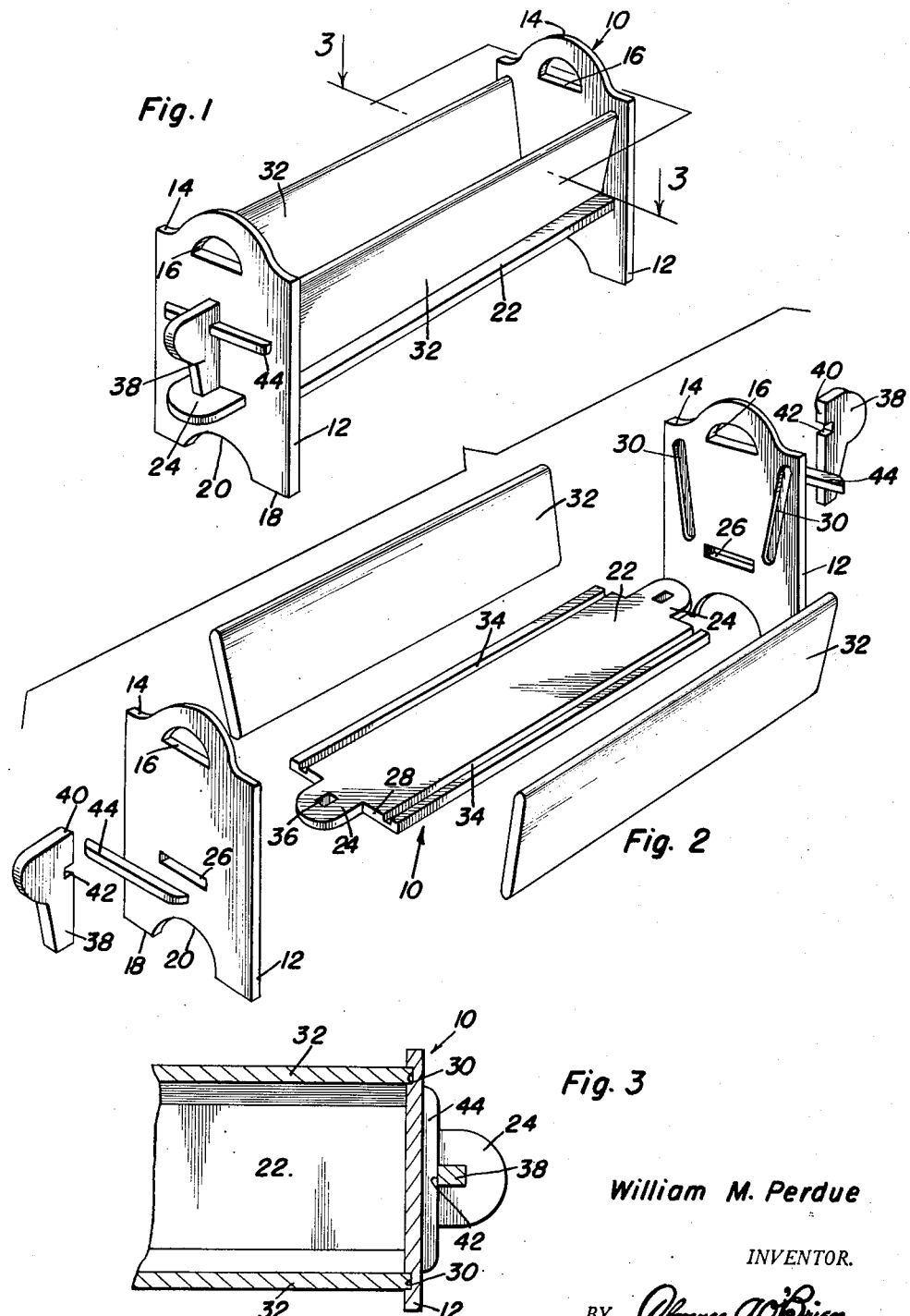
William M. Perdue
INVENTOR.

Patented Oct. 28, 1952

2,615,589

UNITED STATES PATENT OFFICE 2,615,589

FLOWER BOX

William M. Perdue, Little Rock, Ark.

Application July 19, 1950, Serial No. 174,775

1 Claim. (Cl. 217—12)

This invention comprises novel and useful improvements in collapsible boxes, and more particularly pertains to a collapsible flower box.

An important object of this invention is to provide a flower box which has an efficacious appearance, and which can be readily assembled and disassembled.

Another important object of this invention is to provide a collapsible flower box, in accordance with the foregoing object, which flower box is assembled without the use of metallic fasteners or adhesives.

Yet a further object of this invention is to provide a collapsible flower box, in accordance with the foregoing objects, together with an improved means for providing water-tight joints.

An important feature of this invention resides in the provision of a flower box which has a pair of slotted end walls, a bottom wall having longitudinally extending tabs thereon which are receivable in said slots, with side walls disposed between said end walls, and resting upon said bottom wall, and key means for locking the bottom and side walls to the end walls.

Another important feature of this invention resides in the provision of a flower box, in conformity with the foregoing feature, in which the extensions have apertures therein, with keys received in the apertures and abutting the end walls to retain the latter in firm engagement with the side walls.

Still another feature of this invention resides in the provision of a flower box, in accordance with the foregoing features, wherein the key has a slot in the abutting face thereof, with a member received in the slots and extending transversely of the key which member abuts the end wall to aid in fastening the box together, and also to prevent warping on the end walls.

Yet a further feature of this invention resides in the provision of a flower box, in accordance with the foregoing features, in which the registering faces of the end walls are provided with upwardly extending laterally spaced rabbets which receive the side walls, and in which the bottom wall is provided with longitudinally extending recesses which receive the lower edges of the side walls.

These, together with various ancillary objects and features, are attained by this device, the preferred embodiment of which has been illustrated by way of example only in the accompanying drawings wherein:

Figure 1 is a perspective elevational view of the flower box shown assembled;

Figure 2 is a perspective assembly view of the flower box, shown in an unassembled condition; and Figure 3 is a fragmentary horizontal sectional view, taken substantially on the plane 3—3 of Figure 1.

It is a desideratum of this invention to provide a flower box which can be readily assembled and disassembled so that the box can be collapsed and stored during that season in which the flowers and plants are normally dormant. Further, since the flower boxes are often positioned on a porch or the like, it is obviously desirable that the box be so constructed that sand will not be washed out of the box, as the plants are being watered, between the abutting members of the box, onto the support below the box.

Referring now more specifically to the accompanying drawings wherein like numerals designate similar parts throughout the various views, it will be seen that the flower box indicated generally by the numeral 10 includes a pair of end walls 12, which may conveniently be formed of wood or the like, and which may be shaped in any desired manner to provide an efficacious appearance. For this purpose, the end walls 12 may be provided with an upper edge 14 which has an arched contour, with handle forming apertures 16 spaced from the arched upper edge 14, whereby handles are provided to lend portability to the box. Additionally, the bottom edge 18 may be provided with an arcuate recess 20 intermediate the side edges of the end walls 12, as is clearly shown in the accompanying drawings.

A bottom wall 22 having longitudinally extending tabs 24 formed integrally therewith, is provided, the tabs 24 being received in the horizontally disposed slots 26 in the end walls 12, the end 28 of the bottom wall 22 abutting the inner surfaces of the end walls.

It is further intended that the end walls 12 be provided with upwardly extending and laterally spaced rabbets 30, which rabbets may be inclined downwardly and inwardly, as is clearly shown in Figure 2 of the drawings, and which rabbets supportingly receive the side walls 32 therein. It is also intended that the bottom wall 22 be provided with longitudinally extending recesses 34 in the upper surface thereof, to receive the lower edges of the side walls 32, in such a manner as to support and brace the same, and also to prevent soil disposed in the box from seeping out between the juncture of the side and bottom walls. It is thought apparent that the spacing of the lower edges of the rabbets 30 must be the same as the spacing of the recesses 34, and further that the lower edges of the rabbets terminate in the same horizontal plane as the lower edges of the recesses 34, when the extensions 24 on the bottom wall 22 are disposed in the slots 26.

In order to detachably retain the bottom and side walls in engagement with the end walls, the extensions 24 on the bottom walls 22 are provided with apertures 36 which receive the tapered keys 38, and which keys are provided with a forward surface 40 which is adapted to abut the outer surface of the end walls 12, whereby the end walls will be urged inwardly into engagement with the bottom and side walls, when the keys 38 are inserted in the slots 36. Since it is preferred that the box 10 be formed of wood, with the grain of the wood in the end walls 12 extending vertically, there has been provided a means whereby warping of the end walls due to moisture entering the wood panels, will be alleviated. For this purpose, the keys 38 are provided with grooves or notches 42 in the forward edge 40 thereof, which grooves receive the transversely extending reinforcing rails or bars 44, which rails, as is shown more clearly in Figure 3 of the drawing extend substantially across the end walls 12 to reinforce the same and prevent the latter from buckling outwardly. Obviously, since the end walls 28 of the bottom wall 22 abut the inner surface of the end walls 12, the tendency of the latter to buckle inwardly is materially minimized.

From the foregoing, it will appear that the extensions 24 on the bottom wall 22 may be readily positioned in the slots 36 in the end walls 12, the side walls 32 being disposed in the recesses 34 of the bottom wall, and having the ends thereof positioned in the rabbets 30 in the end walls, whereby there is provided a box in which seepage of soil between the junctures of the various elements is minimized, and which may be readily assembled and secured together by means of keys 38, and rails 44.

It is accordingly felt that the operation and construction of the device will be readily apparent, and further discussion is therefore believed to be unnecessary. However, numerous modifications will readily occur to those skilled in the art after a consideration of the foregoing specification and accompanying drawing, it is not intended to limit the invention to that shown and described, but all suitable modifications may be resorted to falling within the scope of the appended claim.

Having described the invention, what is claimed as new is:

A collapsible box comprising a pair of end walls each having a horizontally disposed slot therein, a bottom wall having longitudinally extending tabs thereon, said tabs being received in said slots and extending outwardly therebeyond, side walls disposed between said end walls and having the lower edges thereof resting on said bottom wall, the outwardly extending portions of said tabs having apertures therein, keys extending through said apertures and abutting said end walls to retain said end walls in abutting engagement with said side walls, said keys having notches in the portions thereof which abut the end walls and bars mounted transversely in the notches and engaged with said end walls.

WILLIAM M. PERDUE.

REFERENCES CITED

The following references are of record in the file of this patent:

UNITED STATES PATENTS

| Number | Name | Date |
| --- | --- | --- |
| 521,310 | Gale | June 12, 1894 |
| 653,514 | Kasschau | July 10, 1900 |
| 2,461,189 | Thiel | Feb. 8, 1949 |
| 2,466,121 | Norman | Apr. 5, 1949 |